Aug. 18, 1931.  P. W. LEHMAN  1,819,033
FEEDING AND CUTTING MACHINE
Filed Oct. 15, 1927   7 Sheets-Sheet 1

INVENTOR.
PAUL W. LEHMAN
BY Robert N. Harvey
ATTORNEY.

INVENTOR.
PAUL W. LEHMAN
BY
ATTORNEY.

Patented Aug. 18, 1931

1,819,033

UNITED STATES PATENT OFFICE

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

FEEDING AND CUTTING MACHINE

Application filed October 15, 1927. Serial No. 226,480.

My invention relates to web feeding and cutting machines and more particularly to devices of this character which will operate on rubber stocks such as are used in the manufacture of inner tubes.

It is among the objects of my invention to provide a machine which will feed forward an accurately measured length of web, sever the so fed length to form a blank, advance the blank to space it from the end of the web, and successively repeat the operation to produce a series of accurately cut and spaced blanks ready for further manufacturing operations. Other and further objects will be apparent from the following specification and claims.

In the accompanying drawings which illustrate one embodiment of my invention,

Fig. 3 is a front elevation, on a larger scale, of the cutting and spacing portion of the machine;

Referring to the drawings, 1 designates the main frame of the machine in which is journaled power shaft 2 driven from a motor 3 through suitable reduction gearing 4. From shaft 2 are driven the receiving belt 5, stock feed rolls 6, 7 and 8 and cutter 9 as will be later described.

The receiving belt 5 passes around, and is driven by a drum or pulley 10 secured to a shaft 13 journaled in frame 1. The other end of the belt passes about an idle pulley not shown and the upper run is supported by idle rolls 11 mounted on an auxiliary frame 12.

Figure 25:
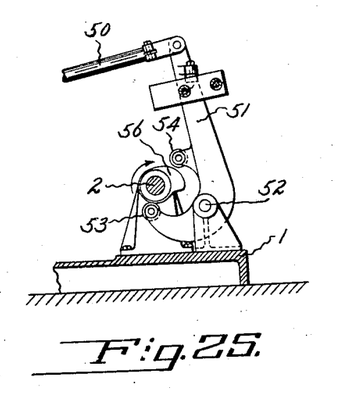
Fig. 25 is a section on line 25—25 of Fig. 22.

The drum 10 is driven in predetermined relations with the feed rolls 6, 7 and 8 and this drive will now be described, particular reference being made to Figs. 3, 5 and 6. A pinion 14 is freely mounted on shaft 13, engaging a rack 15 operating in a guideway 16 and reciprocated by means of connecting rod 17 adjustably connected at 18 to crank 19 secured to power shaft 2. Pinion 14 is formed integral with, or is secured to, a hub 20, having an enlarged portion 23 and a fixed collar 21, the latter being formed with a driving lug 22. Enlargement 23 forms a bearing for a housing 24 within which is mounted a worm gear 25 splined to enlargement 23. Housing 24 carries a lug 26 within which is mounted a worm 27 engaging gear 25, the worm being provided with a capstan head 28, by means of which the space between lugs 22 and 26 may be varied. Adjacent collar 21 is a disc member 29 freely rotatable on hub 33' of a gear 33 and provided with a block 22' positioned to be engaged by lugs 22 and 26. Near its outer periphery disc 29 carries a series of pawls 30 secured to the disc by bolts 31 and engaging a ratchet wheel 32 secured to gear 33. Gear 33 meshes with gear 34 which in turn meshes with gear 35 secured to the shaft of feed roll 7, and driving gear 36 of feed roll 6 and intermediate gear 37 meshing with gear 38 of feed roll 8. Gear 33 is freely mounted on hub 40' of a disc 40, the hub 40' being splined to shaft 13. Disc 40 carries a series of pawls 41 engaging ratchet wheel 42 secured to gear 33 on the side opposite to ratchet wheel 32. It should be noted that pawl and ratchet 30—31 are opposed to pawl and ratchet 41—42. From the above it will be clear that reciprocation of rack 15 in the direction of the arrow in Fig. 3 rotates pinion 14 and its associated parts 20 and 21 which carry driving lug 22 and cause the latter to engage block 22' secured to disc 29 to rotate the latter in the direction of the arrow in Fig. 6. Pawls 30 carried by disc 29 engage ratchet 32 to drive gear 33, to which the ratchet is secured, and through gears 34, 35, 36, 37 and 38 drives the feed rolls 6, 7 and 8. At the same time ratchet 42 secured to the other side of gear 33 engages pawls 41 carried by disc 40 which, being splined to shaft 13, rotates drum 10 to move belt 5 forward as the stock is fed to it by the feed rolls. On the return stroke of rack 15 lug 26 engages block 22' and turns disc 29 in the reverse direction, but pawls 30 slide over ratchet teeth 32 without imparting movement thereto. Adjustment of abutment 26 by worm 28 determines the position in which block 22' is left for subsequent engagement by driving lug 22 and permits accurate control of the length of stock fed forward during the feeding operation just described. After feeding of the stock the portion of the stock fed forward is cut off by mechanism later described and it is then necessary to advance belt 5 with the severed blank, while the feed rolls remain idle, to space the blank on belt 5 from the succeeding blanks. This spacing movement of the belt is accomplished by a separate drive on the opposite end of shaft 13, the right hand end as shown in Fig. 5. This spacing drive is best shown in Figs. 4, 5, 7, 8 and 9. Referring to Fig. 5, a ratchet wheel 45 having a bearing hub 46 is splined to shaft 13 at 47 and a disc member 48 is mounted for free rotation on hub 46. Disc 48 carries a series of pawls 49 (see Figs. 7, 8 and 9) adapted to engage the teeth of ratchet 45. The pawls 49, as are pawls 30 and 41, are so spaced about disc 48 that at least one pawl will engage the ratchet teeth at substantially whatever position the ratchet is left at the end of the movement imparted the shaft 13 by the drive at the other end of the shaft. Disc 48 is operatively connected to power shaft 2 by a connecting rod 50 pivoted to the disc and a bell crank 51, the latter pivoted to frame 1 at 52, and being provided with cam rolls 53 and 54 (see Figs. 4 and 25) engaging cam 56 secured to shaft 2. As will be understood rotation of shaft 13 and drum 10 through pawl and ratchet 45—49 as just described does not impart movement to the feed rolls 6, 7 and 8 since pawls 41 simply slide over ratchet 42 without imparting movement to gear 33 to which ratchet 42 is secured. The spacing movement of the drum 10 is relatively short compared to the stock feeding movement and in order to avoid undue wear on pawls 49 it is desirable to raise them out of contact with ratchet 45 during the stock feeding movement. This is accomplished by means of a disc 57 freely mounted on shaft 13 adjacent ratchet 45 and provided with U-shaped recesses 58 in which are secured pawl lifting members 59. An arm 60 is formed integral with the hub of disc 57 and is connected by rod 61 to an arm 62 secured to rod 63 journaled in the frame (see Fig. 4). Rod 61 is provided with a second arm 64 (see Figs. 3 and 4) connected by link 65 to one arm of a bell crank 66 pivoted at 67, the other arm of which carries a cam roller 68 riding in cam groove 69 of face cam 70.

Figure 1:
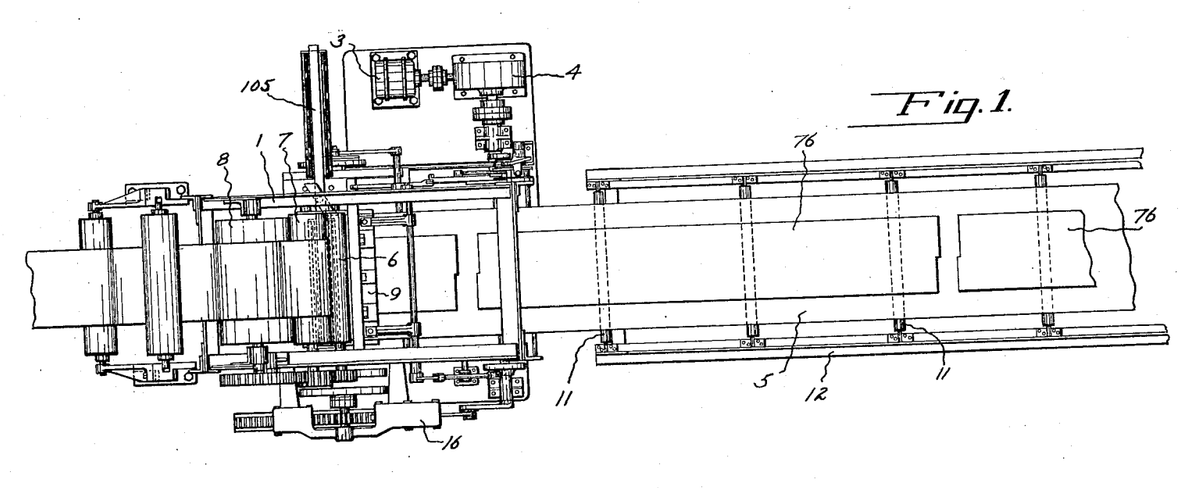
Fig. 1 is a plan view of the machine.
Figure 2:
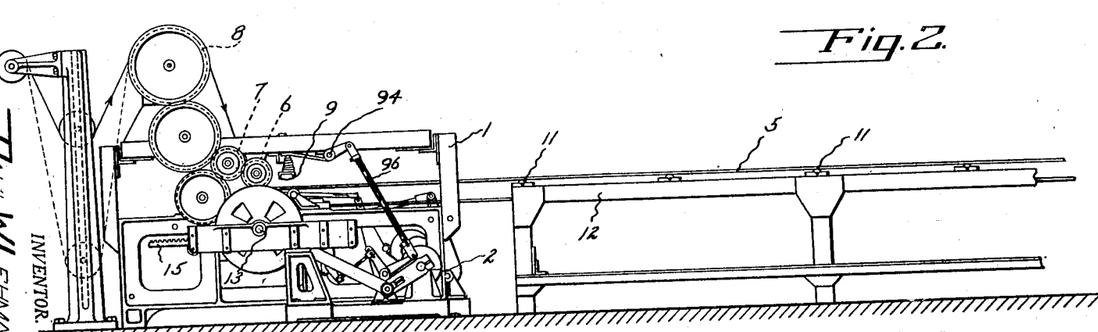
Fig. 2 is a front elevation of the structure shown in Fig. 1.
Figures 15, 16, 17, 18, 19, 20, 21:
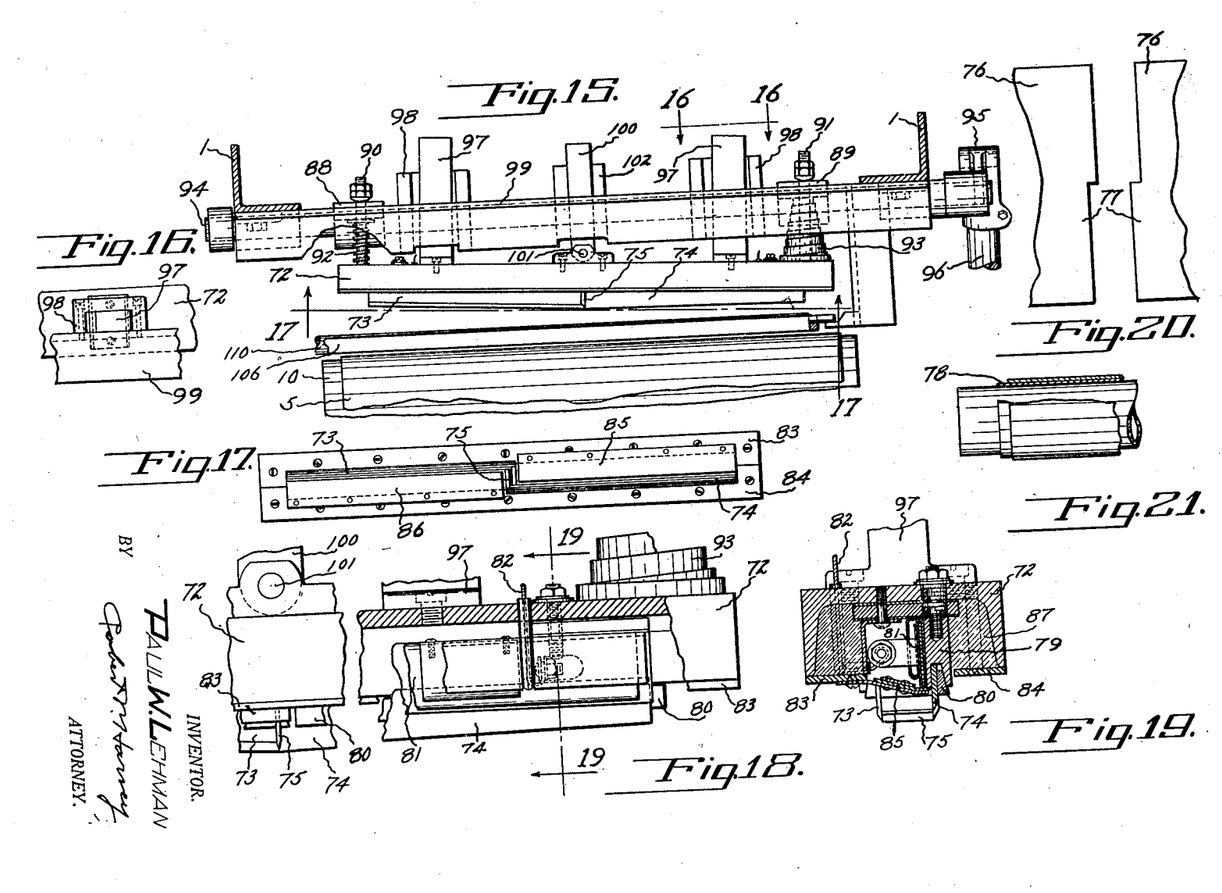
Fig. 15 is a front elevation of the cutting mechanism.
Fig. 16 is a fragmentary plan view of the parts indicated at 16—16 on Fig. 15.
Fig. 17 is a view of the face of the cutter looking in the direction of arrows 17—17 in Fig. 15.
Fig. 18 is a view of the right hand end of the cutter bar as shown in Fig. 15, but on an enlarged scale and with parts broken away and in section.
Fig. 19 is a section on line 19—19 of Fig. 18.
Fig. 20 is a digrammatic view showing the type of cut.
Fig. 21 is a view showing the way the cut end of the stock appears when rolled on a mandrel.
Figure 22:
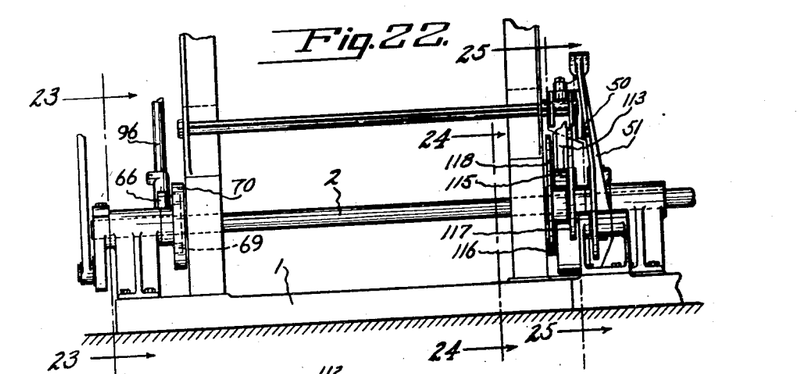
Fig. 22 is a fragmentary end elevation showing the main drive shaft.
Figures 23, 24:
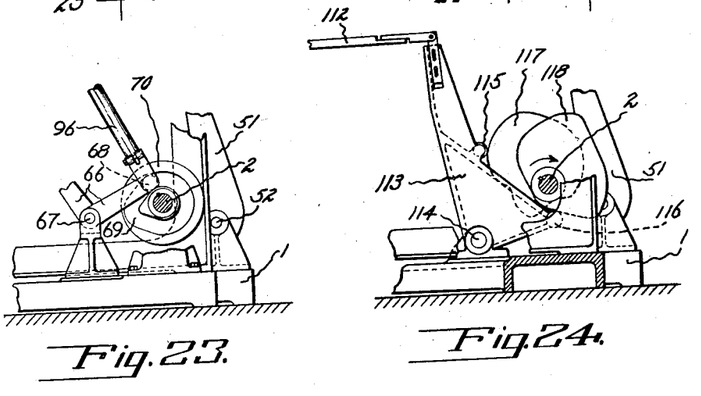
Fig. 23 is a section on line 23—23 of Fig. 22.
Fig. 24 is a section on line 24—24 of Fig. 22.

The cutter, generally indicated at 9 in Fig. 2 and shown in detail in Figs. 15 to 19 comprises a cutting bar in the form of a channel bar 72 in which are secured offset parallel cutting blades 73 and 74 connected by a short transverse blade 75. The parallel blades are slightly arcuate as shown in Fig. 15 to permit a rocking cut and their offset arrangement forms stepped ends to the blanks 76 as indicated at 77 in Fig. 20, which, when a blank is later rolled on a mandrel in subsequent tube making operations, results in a single ply extension at the end of the tube as indicated at 78 in Fig. 21. The cutting blades are held in bar 72 in any desired manner as by blocks 79 and wedges 80, and the blades are heated by any suitable means such as heating elements 81 connected to a source of current by cable 82. The channel 72 is closed by plates 83, 84, 85 and 86 and the free space within the channel is packed with heat insulating material as indicated at 87. The particular type of blade and its mounting may be varied and I do not limit myself to the particular form shown. The bar 72 is suspended from arms 88 and 89 by bolts 90 and 91, respectively, the bar being cushioned by coiled spring 92 surrounding bolt 90 and interposed between arm 88 and bar 72, and coiled telescoping spring 93 similarly mounted around bolt 91. Arms 88 and 89 are secured to a rod 94 journaled in frame 1 and adapted to be rocked to depress cutter bar 72 through an arm 95 connected by rod 96 to bell crank 66 which, as previously described, is operated from cam 68 (see Fig. 23). Bar 72 is guided in its vertical movement by uprights 97 sliding loosely in guideways 98 secured to a cross bar 99 of the main frame, and by upright 100 pivoted at 101 to cutter bar 72 and sliding snugly in guideway 102 also secured to cross bar 99. As the cutter bar descends the right hand end of the blade, as viewed in Fig. 15, contacts with the stock first and further depression of arms 88 and 89 rocks the cutting blade across the stock, the telescoping of spring 93 permitting that end of the bar 72 to rise as the opposite end of the bar is brought down to complete the cutting movement. During the cutting operation the stock is resting on the belt 5 and it is necessary that a platen be inserted between the stock and the belt to oppose the thrust of the knife blades. The rubber stocks upon which my device is particularly adapted to operate are relatively thin and tacky and easily wrinkled, stretched or otherwise damaged. It is therefore essential that the platen shall be inserted between the belt and the stock with the minimum disturbance to the latter.

Figures 4, 10, 11, 12, 13, 14:
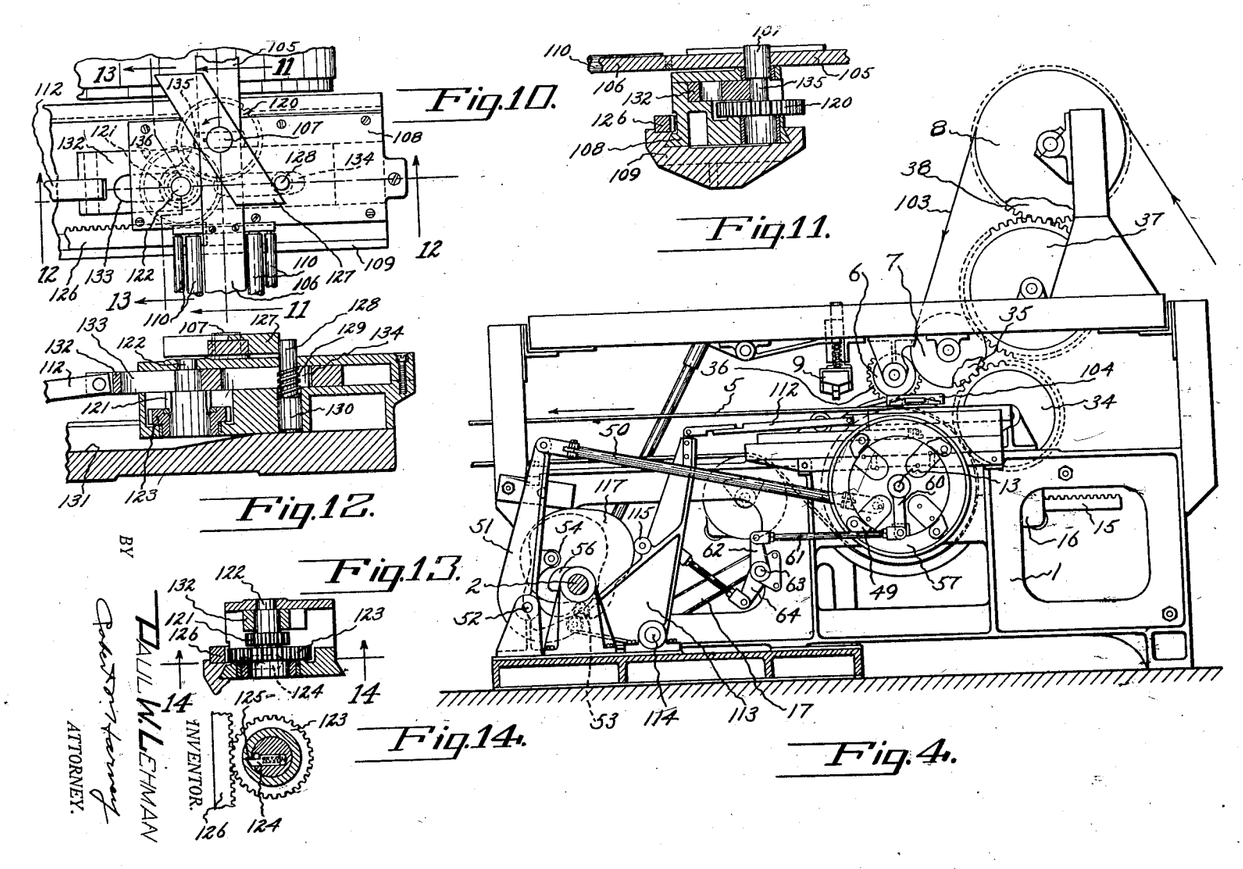
Fig. 4 is a rear elevation of the portion of the machine shown in Fig. 3.
Fig. 10 is a fragmentary plan view of the cutting platen.
Fig. 11 is a section on line 11—11 of Fig. 10.
Fig. 12 is a section on line 12—12 of Fig. 10.
Fig. 13 is a section on line 13—13 of Fig. 10.
Fig. 14 is a section on line 14—14 of Fig. 13.
Figures 5, 6, 7, 8, 9:
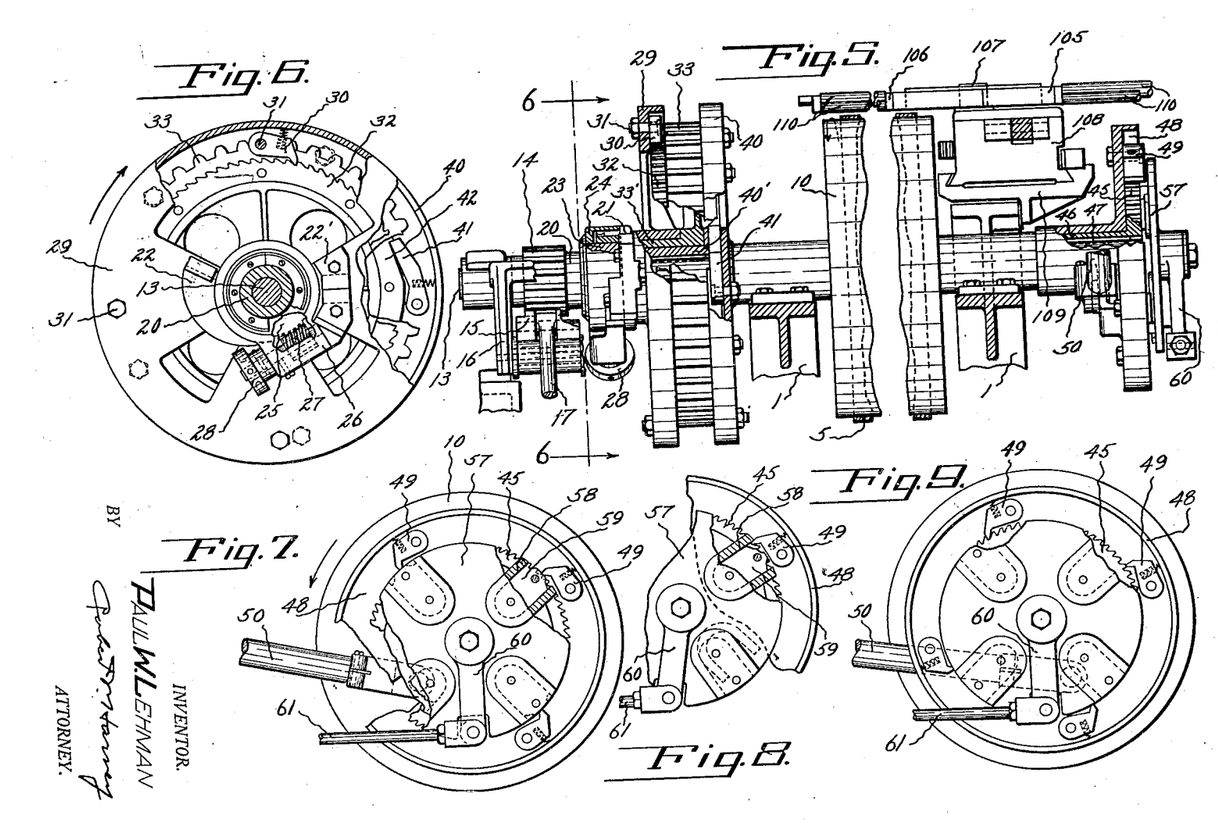
Fig. 5 is a detail view, partly in section, showing the manner in which the driving drum of the stock feeding belt is driven.
Fig. 6 is a section substantially on line 6—6 of Fig. 5, parts being broken away.
Figs. 7, 8 and 9 are detail views of the driving means located at the left hand end of Fig. 5.

As perhaps best shown in Fig. 4 the path of the stock 103 to the receiving belt and cutter is over roll 8, between rolls 7 and 6 and beneath the latter roll to the belt. At the proper time in the forward feed of the stock I move a platen, generally indicated at 104 in Fig. 4, behind roll 6 slightly above the belt and into contact with the underside of the stock and then move the platen forward with and at the same speed as the stock until the platen is positioned beneath the cutter at which time movement of stock, platen and belt ceases and the cutter operates to cut the stock as previously described. As best shown in Figs. 1, 5 and 10 to 14 inclusive, the platen is in the form of oppositely extending arms 105 and 106 secured to the upper end of a shaft 107 journaled in a carriage 108 slidable in a guideway 109 which is supported on the main frame at one side of the receiving belt as shown in Fig. 5. The arms 105 and 106 are provided at their edges with anti-friction rolls 110. The carriage 108 is reciprocated in guideway 109 through an adjustable link 112 (see Figs. 4 and 24) pivoted at one end to the carriage and at the other to a bell crank 113 pivoted at 114 to the main frame and provided with cam rolls 115 and 116 engaging cams 117 and 118, respectively, secured to power shaft 2. Referring to Figs. 10 to 14 inclusive, shaft 107 carrying arms 105 and 106 is provided with a gear 120 meshing with a gear 121 cut in an enlargement of a shaft 122 journaled in carriage 108. Shaft 122 also carries a pinion 123 operatively connected to the shaft by pin pawl 124 and internal ratchet 125, as shown in Fig. 14, to drive the shaft in one direction only. Pinion 123 engages a fixed rack 126 secured at one side of guideway 109. Secured to the upper end of shaft 107 is a positioning stop bar 127 engaging a pin 128 mounted in carriage 108 and urged downwardly out of the path of bar 127 by spring 129 compressed between the cover of carriage 108 and enlargement 130 formed on the pin. Such withdrawal of pin 128 is permitted when the carriage is moved forward, as later described, by the provision of a recess 131 in the bed of guideway 109. Connecting rod 112 is connected to carriage 108 by means of a plate 132 slidably mounted in the carriage and provided with a slot 133 forming a lost motion connection with shaft 122. Plate 132 is provided with a second slot 134 to accommodate pin 128. Shaft 107 is held against rotary motion during the forward motion of the carriage, that is toward the left in Figs. 4 and 10, by a slab 135 formed intermediate of its length and engaging the side of plate 132. The plate 132 is arcuately recessed at 136 to permit passage of slab 135 and rotation of shaft 107 on the rearward movement. The operation of this part of the device will now be described. With the parts in the position shown in Figs. 1, 4, 10 and 12, cams 117 and 118 operate to move carriage 108 forward. The rear end of slot 133 is in engagement with shaft 122, slab 135 is in engagement with the side of slide 132 and pinion 123, due to its ratchet connection to shaft 122, idles along rack 126. As a result carriage 108 with arm 105 extended over belt 5 advances bringing arm 105 beneath the stock 103 as it leaves roll 6 and advancing the arm at the same speed as the stock and belt until the arm is beneath cutter 9. At this point movement of the belt, feed of the stock and movement of carriage 108 ceases and the cutter is operated to sever a blank from the web. The spacing drive of the drum 10 now comes into operation as previously described to advance the belt and the severed blank. During the first part of the spacing movement carriage 108 and arm 105 remain stationary, but before the feeding of the stock is resumed carriage 108 is again advanced to withdraw arm 105 from beneath the severed end of the web. At the end of the forward movement of carriage 108 its parts are still in the relative positions shown in Figs. 10 and 12, except that pin 128 has withdrawn into recess 131. The direction of movement of connecting rod 112 is now reversed. Plate 132 moves backwardly taking up the lost motion of slot 133 and bringing arcuate recess 136 opposite slab 135, the carriage as a whole remaining stationary. When the forward end of slot 133 contacts with shaft 122, carriage 108 starts its rearward movement. Pin 128 is still in recess 131 and slab 135 is free to turn in recess 136 and gear 123 moves along rack 126 in the direction to drive its shaft 122 through pawl and ratchet 124—125. As a result of the rotation of shaft 122 gear 121 secured thereto and meshing with gear 120 on shaft 107 transmits rotation to the latter and swings arm 105 in the direction of the arrow in Fig. 10. During the rearward movement of the carriage shaft 107 rotates 180° bringing arm 106 into the position occupied by arm 105 in Fig. 10. Just prior to the completion of the rearward travel of the carriage pin 128 rides out of recess 131 and into position to again engage stop bar 127 to prevent overthrow of the arms 105 and 106 and assure that slab 135 is parallel with the sides of plate 132, at the completion of the rearward movement of the carriage. Connecting rod 112 then starts its forward movement taking up the lost motion due to slot 133 and withdrawing recess 136 to lock arms 105 and 106 in position ready for a repetition of the cycle just described.

Figure 26:
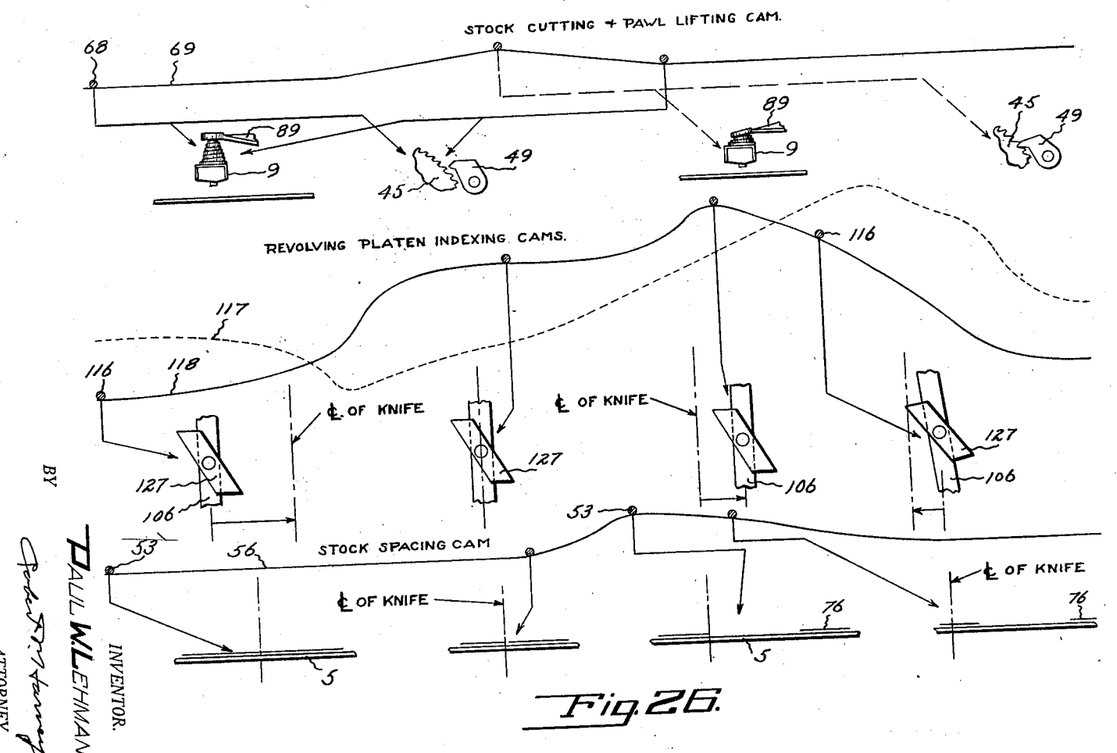
Fig. 26 is a diagram showing the coordination of the three cams controlling the spacing and cutting operations.

It will be understood that the cycle of operation of the various parts as described above in many cases overlaps, as is illustrated in Fig. 26 where parts of the operation of the cutter, platen, and stock spacing cams are shown coordinated graphically.

The general operation may be summarized briefly as follows: On the operative stroke of rack 15 the stock feed rolls and belt are simultaneously advanced an amount corresponding to the predetermined length of a blank. During the latter part of this movement the platen 104 is moved forward beneath and with the stock to a point beneath the cutter. The stock and belt movement then stops, and the cutter is actuated to sever the blank. As soon as the cutting operation is completed the drive on the end of the drum opposite rack 15 is actuated to advance the belt to space the blank, this belt movement being accomplished without actuation of the stock feed and without disturbing the driving mechanism associated with rack 15 which is coming into position for the next cycle of operation. As soon as the cut blank has been advanced the platen 104 is rotated from its position under the cutter. The rack 15 now again starts the cycle during the first part of which the platen 104 is moved backwardly and its rotation completed to place the opposite arm in position to be advanced for the next cutting operation.

Having thus described my invention, I claim:

1. A device of the character described comprising a stock receiving conveyor, means to feed stock to the conveyor, a drive shaft for the conveyor, a driven member freely rotatable about said shaft, a gear operatively connected to the stock feeding means and freely rotatable about said shaft, a one-way driving connection between the driven member and said gear, a one-way driving connection between said gear and the shaft whereby rotation of the driven member in one direction simultaneously advances the stock and the receiving conveyor, a second driven member freely rotatable about said shaft and a one-way driving connection between said second driven member and said shaft to drive the latter and advance the conveyor independently of said first recited driving means.

2. A device of the character described comprising means for simultaneously advancing a web of stock and a stock receiving conveyor, cutting mechanism positioned in the path of the stock and conveyor travel, a movable platen positioned to be inserted between the stock and the conveyor at the point where the stock meets the conveyor and means to advance the platen at the same speed as the stock and conveyor to a point beneath the cutting mechanism.

3. A device of the character described comprising means for simultaneously advancing a web of stock and a stock receiving conveyor, cutting mechanism positioned in the path of the stock and conveyor travel, a movable platen positioned to be inserted between the stock and the conveyor at the point where the stock meets the conveyor, means to advance the platen at the same speed as the stock and conveyor to a point beneath stock and conveyor, means to actuate the cutting mechanism to sever a blank from the web, means operating independently of the first named means for advancing the conveyor and the cut blank, and means to advance the platen out of contact with the cut end of the web.

4. In a device of the character described a platen adapted to be positioned between a web of stock and a stock receiving conveyor comprising a blade pivoted at its center to a reciprocable carriage to form two oppositely extending platen arms, means associated with the carriage to maintain one of said arms extended over the conveyor during travel of the carriage in one direction and means to rotate said arms through an arc of substantially 180° during the travel of the carriage in the opposite direction.

PAUL W. LEHMAN.